United States Patent
Grün et al.

(10) Patent No.: US 7,034,081 B2
(45) Date of Patent: Apr. 25, 2006

(54) HIGHLY BRANCHED DIENE POLYMERS

(75) Inventors: Michael Grün, Siegburg (DE); Silvia Mücke, Leverkusen (DE); Claus Wrana, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/660,038

(22) Filed: Sep. 11, 2003

(65) Prior Publication Data

US 2004/0054110 A1 Mar. 18, 2004

(30) Foreign Application Priority Data

Sep. 16, 2002 (DE) ................................. 102 42 942

(51) Int. Cl.
*C08F 8/00* (2006.01)
(52) U.S. Cl. .................... 525/326.1; 525/383; 525/374
(58) Field of Classification Search ................ 525/383, 525/374, 326.1
See application file for complete search history.

(56) References Cited

U.S. PATENT DOCUMENTS

| 4,914,248 A | 4/1990 | Kitagawa et al. ............ 525/113 |
| 2003/0114612 A1 | 6/2003 | Grun et al. .................. 526/204 |

FOREIGN PATENT DOCUMENTS

| EP | 1 153 972 | 11/2001 |
| EP | 1 153 972 A1 * | 11/2001 |
| JP | 7-330959 | 12/1995 |
| WO | 01/23467 | 4/2001 |

* cited by examiner

*Primary Examiner*—Ling-Sui Choi
(74) *Attorney, Agent, or Firm*—Jennifer R. Seng

(57) ABSTRACT

The present invention relates to highly branched and coupled polymers based on conjugated dienes or on conjugated dienes and vinylaromatic compounds and on polyfunctional, organic compounds with at least four groups which are capable of coupling. Vulcanization products and shaped rubber articles of all types, in particular tires having an improved rolling resistance, can be produced from the highly branched diene polymers according to the present invention.

4 Claims, No Drawings

HIGHLY BRANCHED DIENE POLYMERS

FIELD OF THE INVENTION

The present invention relates to highly branched and coupled diene polymers and a process for their preparation and use.

BACKGROUND OF THE INVENTION

It is known, in particular for use in tire construction, to link (couple) live, preferably live alkali-terminated polymers based on conjugated dienes or based on conjugated dienes and vinylaromatic compounds with organic or inorganic compounds which are suitable for this purpose. It is also known that the processing properties and the physical and dynamic properties, preferably those connected with the rolling resistance of tires are thereby improved.

WO 01/23467 A1 and JP 7 330 959 A2 disclose rubber mixtures for the production of tire treads which contain, inter alia, diene rubbers which have been coupled with polyfunctional compounds containing two or more epoxide groups. Although according to the two patent publications mentioned the physical properties, in particular the rolling resistance, of the tires produced are improved with the aid of the rubber mixtures described therein, it has been found, however, that it is possible to improve further the physical properties and the processing properties of the rubber mixtures described in the two patent publications using specific coupled and modified polymers based on conjugated dienes or conjugated dienes and vinylaromatic compounds. Co-pending German Patent Application No. 10 217 800.3 discloses coupled diene polymers.

It has now been found that the coupled and modified diene polymers described in the German patent application mentioned can be improved further in their physical properties, in particular in respect of the rolling resistance, if the highly branched and coupled diene polymers described in more detail below are used for the production of tires, preferably for the production of tire treads.

SUMMARY OF THE INVENTION

The present invention relates to branched and coupled polymers based on conjugated dienes or on conjugated dienes and vinylaromatic compounds and on polyfunctional, organic compounds having at least 4 groups which are capable of coupling, wherein the polymers have a molecular weight ratio ($M_w/M_n$) of 1.0 to 3.0, a weight-average molecular weight ($M_w$) of 400,000 to 2,000,000, a glass transition temperature (Tg) of −50 to −10° C., an amount of 1,2-vinyl groups of 40 to 80%, based on the diene units present in the polymer, and a degree of coupling of at least 45%, at least 60% of the coupled polymers having a degree of branching of greater than two, with the proviso that the amount by weight of polymers with 4- and more than 4-fold branching, based on 100 g of polymer, is always greater than the amount by weight of polymers with 3-fold branching, and wherein the difference in the solution viscosity of the polymers before and after the coupling is in the range from 100 to 400 (measured with a solution of 0.5 g polymer in 100 ml toluene, determined at 25° C. with an Ubbelohde viscometer).

DETAILED DESCRIPTION OF THE INVENTION

Branched and coupled polymers having a molecular weight ratio ($M_w/M_n$) of 1.5 to 2.8, a weight-average molecular weight ($M_w$) of 600,000 to 1,400,000, a glass transition temperature ($T_G$) of −40 to −15° C., an amount of 1,2-vinyl groups of 50 to 70% and a degree of coupling of 48 to 80% are preferred. In addition, 70 to 95% of the coupled polymers have a degree of branching of greater than two, the difference in the solution viscosity before and after coupling is 140 to 300 and the amount by weight of polymers with 4- and more than 4-fold branching is 10–50%, preferably 15–45% greater than the amount of polymers with 3-fold branching.

The abovementioned degree of coupling is defined as the amounts of polymers that have reacted with the coupling agents employed, based on 100 g of the total amount of polymers present.

The degree of branching stated is defined as the amount by weight of polymers with 3- and more than 3-fold branching, based on 100 g of the total amount of polymer present.

The polymers according to the invention are prepared in the conventional manner by reaction of live anionic polymers, which are conventionally terminated by appropriate alkali metals, with the organic, polyfunctional compounds employed according to the present invention. Anionic polymerization of unsaturated compounds is a widely used process, for example for the preparation of corresponding elastomers, and is of course known to those skilled in the art. Such anionic polymerization reactions and the appropriate theoretical background are described in more detail, inter alia, in Polymer Synthesis (Paul Rempp and Erdward W. Merill) Huethig und Wepf-Verlag, Basle, Heidelberg, New York, 1986, page 114 to page 138 and in Science and Technology of Rubber, second edition, (edited by: Shane E. Mark, Burak Erman and Frederick R. Eirich) Academic Press, 1994, page 60 to 70. Reference is furthermore made to DE 198 57 768 A1, where the coupling of live alkali metal-terminated polymers with a linking agent containing epoxide groups is described.

Conjugated dienes, which can be employed for building up the live anionic polymers, of the present invention, include all the known conjugated dienes, which are commonly used for the preparation of corresponding polymer anions. Examples which may be mentioned are: 1,3-butadiene, 2,3-dimethyl-1,3-butadiene, 3-butyl-1,3-octadiene, isoprene, piperylene, 1,3-hexadiene, 1,3-octadiene and 2-phenyl-1,3-butadiene, preferably 1,3-butadiene and isoprene, and mixtures thereof.

Suitable vinylaromatic compounds are also the known vinylaromatic compounds which can be copolymerized together with the conjugated dienes. Examples which may be mentioned include styrene, p-methylstyrene, x-methylstyrene, 3,5-dimethylstyrene, vinylnaphthalene, p-tert-butylstyrene, divinylstyrene, divinylethylene, 4-propylstyrene, p-tolylstyrene, 1-vinyl-5-hexylnaphthalene and 1-vinylnaphthalene, preferably styrene, or mixtures thereof. In the copolymerization of the conjugated dienes mentioned with the vinylaromatic compounds, the amount of vinylaromatic compounds employed is usually 5 to 55 wt. %, preferably 10 to 45 wt. %, and the amount of conjugated dienes employed is correspondingly 45 to 95 wt. %, preferably 55 to 90 wt. %. The copolymers can be random, staged blocks or complete block copolymers of the various monomers mentioned.

The live anionic polymers based on the monomers mentioned can be terminated by alkali metals and are employed in this form for reaction in situ with the functional organic compounds according to the present invention.

The alkali metals lithium, sodium, potassium, rubidium and caesium, preferably lithium, are possible as the terminating alkali metal.

The organic, polyfunctional compounds having at least 4 groups capable of coupling which are employed, include those organic compounds which contain, for example, epoxide groups, isocyanate groups, aldehyde groups, ester groups, acid chloride groups, alkoxysiloxane groups and silicon halide and tin halide groups. Epoxide groups, ester groups and silicon halide and tin halide groups are preferred, epoxide groups being more preferred.

When such polyfunctional compounds are employed and these compounds are reacted with the polymer anions intermediately formed (coupling reactions), electrophilic groups, for example hydroxyl groups, are also formed (reaction of the polymer anions with compounds containing epoxide groups).

The branched and coupled diene polymers prepared according to the present invention contain about 10 to 35 wt %, based on the molecular weight of the coupling agent, preferably 12 to 30 wt. % of such electrophilic groups formed in the coupling reaction.

Polyfunctional organic compounds which have 4 to 16, preferably 4 to 6 and more preferably 4 groups which are capable of reaction with the live anionic polymers are preferably employed.

Such functional organic compounds which are mentioned include: polyfunctional methoxysiloxanes, polyfunctional ethoxysiloxanes and 4,4-methylene-bis-(N,N-diglycidylaniline), preferably polyfunctional ethoxysiloxanes and 4,4-methylene-bis-(N,N-diglycidylaniline), more preferably 4,4-methylene-bis-(N,N-diglycidylaniline). The polyfunctional organic compounds which are capable of coupling can of course also be employed as any desired mixtures with one another.

To prepare the branched and coupled polymers according to the present invention, the reaction of the live anionic polymers with the functional organic compounds according to the present invention is usually carried out in the presence of inert, aprotic solvents.

Such inert aprotic solvents can be paraffinic hydrocarbons, such as isomeric pentanes, hexanes, heptanes, octanes and decanes, 2,4-trimethylpentane, cyclopentane, cyclohexane, methylcyclohexane, ethylcyclohexane or 1,4-dimethylcyclohexane, or aromatic hydrocarbons, such as benzene, toluene, ethylbenzene, xylene, diethylbenzene or propylbenzene. These solvents can be used individually or in combination. Cyclohexane and n-hexane are preferred.

A polar solvent can optionally be added to the aprotic solvents mentioned in the copolymerization of vinylaromatic compounds with the conjugated dienes in order to increase the rate of polymerization and/or to modify the polymer structures. Suitable polar solvents include ethers, such as tetrahydrofuran, diethyl ether, cycloamyl ether, dipropyl ether, ethylenedimethyl ether, ethylenediethyl ether, diethylene glycol, dimethyl ether, tert-butoxyethoxyethane, bis-(2-dimethylaminoethyl) ether or (dimethylaminoethyl) ethyl ether, preferably tert-butoxyethoxyethane, bis-(2-dimethylaminoethyl) ether or (dimethylaminoethyl) ethyl ether, and tertiary amines, such as trimethylamine, triethylamine, tripropylamine or tetramethylethylenediamine, preferably triethylamine or tetramethylethylenediamine. With the addition of polar solvents, it is furthermore possible for the microstructure of the corresponding copolymers to be modified, for example from staged block to random. The polar solvents to be employed for modification of the polymer structure are in general employed in the anionic polymerization in amounts of 0.1 to 40 mol, preferably 0.1 to 10 mol per mol of initiator employed.

The amount of solvents to be employed can vary within wide limits. It is conventionally about 300 to 1,500 parts by wt. per 100 parts by wt. of total monomers.

The coupled and modified polymers according to the present invention are essentially prepared in two steps. In the first step a live anionic, alkali metal-terminated polymer is prepared, which second step is linked with the functional organic compounds according to the present invention which are defined above. These organic compounds can be added at any desired point in time of the polymerization, depending on the desired properties of the polymers to be prepared.

The first step for the preparation of the polymers according to the present invention is in general carried out by reacting an alkali metal initiator system with the selected monomer or the monomers in order to form the live anionic polymers. This polymerization step can be carried out in one step or in a sequence of steps. If the polymeric chain is a homopolymer or a random or block-copolymer of two or more monomers, the monomers are polymerized simultaneously with the alkali metal initiator. If the polymeric chain is a block copolymer containing two or more homo- or copolymer blocks, the individual blocks can be produced by the incremental or successive addition of monomers.

The alkali metal-based initiator systems used in the first step of the process for the preparation of the polymers linked according to the present invention are based on alkali metal compounds of the general formula $R^1$-M, wherein $R^1$ is a hydrocarbonyl radical having 1 to 20 carbon atoms and M is an alkali metal chosen from lithium, sodium, potassium, rubidium or caesium. Examples of such lithium starters include methyllithium, isopropyllithium, n-butyllithium, s-butyllithium, isobutyllithium, tert-butyllithium, tert-octyllithium, hexyllithium, n-undecyllithium, phenyllithium, naphthyllithium, p-tolyllithium, 4-phenylbutyllithium, cyclohexyllithium and 4-cyclohexylbutyllithium. The amount of alkali metal compounds employed depends on the desired properties of the polymer, in particular on the desired molecular weight. The alkali metal compounds are employed in amounts of 0.2 to 1.2 mmol, preferably 0.3 to 1.0 mmol per 100 g of total polymers.

The polymerization reaction is carried out in the presence of the abovementioned inert aprotic solvents, optionally mixed with polar solvents.

The polymerization temperature is in general 40 to 130° C., preferably 70 to 110° C. The polymerization is carried out up to quantitative conversion. Under the reaction conditions according to the present invention, the reaction time is up to 1 hour, preferably up to 40 minutes. The polymerization can be carried out either under normal pressure or under increased pressure (1 to 10 bar).

For carrying out the second reaction step (linking step), the polymerization mixture obtained in the polymerization is mixed with the functional organic compounds mentioned, which serve as coupling agents, it being preferable for the coupling agents to be added to the reaction mixture in the form of a 10 to 50 percent solution in styrene.

During the coupling reaction it should be ensured that troublesome compounds which could impair the coupling reaction are not present. Such troublesome compounds are e.g. carbon dioxide, oxygen, water, halides, alcohols and organic and inorganic acids.

The coupling reaction is conventionally carried out at temperatures which approximately correspond to the temperatures of the polymerization reaction. This means that the linking reaction is carried out at temperatures of about 50 to 120° C. The linking reaction can also be carried out under normal pressure and under increased pressure (1 to 10 bar).

The reaction time of the coupling reaction is relatively short. It is in the range from 10 to 40 minutes. Preferably, the polymerization and the subsequent in situ coupling reaction should not last substantially longer than 60 minutes under the reaction conditions stated. If the reaction time is too long, there is the risk of undesirable side reactions and therefore the formation of by-products.

About 0.1 to 0.28 mol, preferably 0.12 to 0.22 mol of polyfunctional organic compounds per mol of alkali metal-terminated polymer anions are employed according to the present invention for the coupling reaction.

After the linking reaction, the coupled and modified polymers which now result are isolated by treating the reaction mixture with terminating reagents which contain active hydrogen, such as alcohols or water or corresponding mixtures. It is furthermore advantageous if antioxidants are added to the reaction mixture before the linked polymer is isolated.

The polymer according to the present invention is separated off in the conventional manner, for example by steam distillation or flocculating out with a suitable flocculating agent, such as alcohols. The polymer which has been flocculated out is then removed from the resulting medium, for example by centrifugation or extrusion. Residual solvents and other volatile constituents can be removed from the polymer isolated by heating, optionally under reduced pressure or in a fan air stream.

The preparation of the polymers according to the present invention can be carried out either in a discontinuous or in a continuous procedure. The discontinuous procedure in one reactor is preferred.

The present invention therefore also provides a process for the preparation of branched and coupled polymers based on conjugated dienes or on conjugated dienes and vinylaromatic compounds in the physical parameters described above, which is characterized in that conjugated dienes or conjugated dienes with vinylaromatic compounds are polymerized in the conventional manner in the presence of inert organic solvents and in the presence of organic alkali metal compounds, and the alkali metal-terminated polymer anions formed are reacted with organic, polyfunctional compounds which have at least 4 groups which are capable of coupling, the molar ratio of polyfunctional compounds employed to alkali metal-terminated polymer anions being 0.1 to 0.22:1.

The conventional compounding components, such as fillers, dyestuff, pigments, softening agents and reinforcing agents, can of course also be added to the polymers according to the invention. Furthermore the known rubber auxiliaries and crosslinking agents as described in "Handbuch für die Gummiindustrie", 2nd edition, 1991, publisher: Bayer A G. It is furthermore also possible to mix the polymers according to the present invention with known rubbers in a known manner in order to achieve particular profiles of properties for the shaped rubber articles to be produced.

The coupled and branched diene polymers according to the present invention can be used in a known manner for the production of vulcanization products or shaped rubber articles of all types, preferably for the production more preferred.

EXAMPLES

Example 1 a) Preparation of an Anionic Lithium-Terminated Styrene/Butadiene Copolymer:

8,500 g of technical-grade hexane were initially introduced into an autoclave flushed with nitrogen and provided with a stirrer. Thereafter, 46 mmol tert-butoxy-ethoxy-ethane, 0.94 mmol potassium tert-amylate and 9.06 mmol n-butyllithium (BuLi) were added, while stirring, to the hexane initially introduced. 1,200 g of dried, destabilized 1,3-butadiene and 340 g of dried, destabilized styrene were then metered into this mixture. The polymerization of the monomers was carried out at a temperature of 70° C. up to quantitative conversion of the monomer.

b) Coupling of the Copolymer Prepared According to a)

1.65 mmol 4,4-methylene-bis-(N,N-diglycidylaniline) were added directly, in situ, to the polymer obtained in a) and the mixture was stirred at a temperature of approx. 70° C. for about 30 minutes. The contents of the reactor were then cooled and the reaction was stopped with ethanol. The product obtained was then stabilized with Vulkanox® BHT and dried at 60° C. in a drying cabinet.

Molar ratio of coupling agent to Li-terminated polymer: 0.18 mmol 4,4-methylene-bis-(N,N-diglycidylaniline)

The molar ratios stated are based on complete coupling.

Example 2

The preparation of the non-coupled and non-modified styrene/butadiene copolymer was carried out as described in example 1a).

Quantitative Data
a) n-Butyllithium: 11.3 mmol
b) tert-Butoxy-ethoxy-ethanol: 46 mmol
c) Potassium tert-amylate: 0.94 mmol The subsequent coupling of the copolymer prepared was carried out directly, in situ, with 2.06 mmol 4,4-methylene-bis-(N,N-diglycidylaniline). The reaction times of the coupling and the working up of the polymers were as described under 1b).

Molar ratio of coupling agent to Li-terminated polymer: 0.18 mol (coupling agent):1 mol (Li-terminated polymer).

The molar ratio stated is also based on complete coupling with the polymer.

Comparison Example 1 (Molecular Weight<600,000 g/mol)

The preparation of the non-coupled and non-modified styrene/butadiene copolymer was carried out as in example 1a).

Quantitative Data
a) n-Butyllithium: 17.6 mmol
b) tert-Butoxy-ethoxy-ethane: 51 mmol
c) Potassium tert-amylate: 0.94 mmol The subsequent coupling of the copolymer prepared was carried out directly, in situ, with 3.21 mmol 4,4-methylene-bis-(N,N-diglycidylaniline). The reaction times of the coupling and the working up of the polymers were as described under 1b).

Molar ratio of coupling agent to Li-terminated polymer: 0.18 mol (coupling agent):1 mol (Li-terminated polymer).

Comparison Example 2 (Excess Coupling Agent)

The preparation of the non-coupled and non-modified styrene/butadiene copolymer was carried out as described in example 1a).

Quantitative Data
a) n-Butyllithium: 15.27 mmol
b) tert-Butoxy-ethoxy-ethane: 49 mmol
c) Potassium tert-amylate: 0.94 mmol The subsequent coupling of the copolymer prepared was carried out directly, in situ, with 11.47 mmol 4,4-methylene-bis-(N,N-diglycidylaniline). The reaction times of the coupling and the working up of the polymers were as described under 1b).

Molar ratio of coupling agent to Li-terminated polymer: 0.73 mol (coupling agent):1 mol (Li-terminated polymer).

|  | Compound 1 | Compound 2 | Compound 3* | Compound 4* |
|---|---|---|---|---|
| Stearic acid | 1 | 1 | 1 | 1 |
| Vulkanox ® HS**** | 1 | 1 | 1 | 1 |
| Vulkanox ® 4020*** | 1 | 1 | 1 | 1 |
| Vulkacit ® CZ****** | 1.8 | 1.8 | 1.8 | 1.8 |
| Vulkacit ® D******* | 2 | 2 | 2 | 2 |
| Sulfur | 1.5 | 1.5 | 1.5 | 1.5 |
| *Comparison Mixture properties, DIN 53523 | | | | |
| Mooney viscosity ML1 + 4@100° C. | 94 | 70 | 56 | 61 |
| Vulcanization product properties, ISO 37 | | | | |
| Strength, MPa | 18.2 | 17.3 | 19.6 | 15.5 |
| Elongation at break, % | 369 | 367 | 460 | 396 |
| Modulus 100%, MPa | 2.6 | 3.2 | 2.5 | 3.1 |
| Modulus 300%, MPa | 13.6 | 12.4 | 10.7 | 10.6 |

|  | ML 1 + 4 @ 100° C. | Styrene wt. [%] | 1,2-vinyl wt. [%] | L value [ml/g] | ΔL value | Tg [° C.] | $M_w$ [dalton] | $M_w/M_n$ | Degree of coupling [%] | C2 = 2nd coupling C3 = 3rd coupling C4 = 4th coupling | Degree of branching [%] |
|---|---|---|---|---|---|---|---|---|---|---|---|
| Example 1 (before coupling) | 102.5 | 20.3 | 49.3 | 351 | 205 | −24.3 | 536010 | 1.7 | — | — | |
| Example 1 (with coupling) | 128 | 20.3 | 49.3 | 556 | | −24.3 | 1029178 | 2.6 | 65 | C2 = 15% C3 = 35% C4 = 50% | 85% |
| Example 2 (before coupling) | 59.7 | 20.5 | 52.4 | 228 | 128 | −22.4 | 342552 | 1.4 | — | — | |
| Example 2 (with coupling) | 80.7 | 20.5 | 52.4 | 356 | | −22.4 | 1029178 | 2.1 | 58 | C2 = 16 C3 = 38 C4 = 46 | 84% |
| Comparison example 1 (before coupling) | 41.1 | 19.8 | 50.1 | 215 | 74 | −23.9 | 280522 | 1.3 | — | | |
| Comparison example 1 (with coupling) | 59.1 | 19.8 | 50.1 | 289 | | −23.9 | 459651 | 1.8 | 34 | C2 = 16% C3 = 31% C4 = 53% | 84% |
| Comparison example 2 (before coupling) | 41.1 | 19.8 | 52.1 | 217 | 41 | −23.3 | 269227 | 1.3 | | | |
| Comparison example 2 (with coupling) | 59 | 19.8 | 52.1 | 258 | | −23.3 | 396715 | 1.8 | 39 | C2 = 39% C3 = 33% C4 = 28% | 61% |

|  | Compound 1 | Compound 2 | Compound 3* | Compound 4* |
|---|---|---|---|---|
| Rubber mixtures with various coupled polymers Silica mixtures | | | | |
| Example 1 | 70 | | | |
| Example 2 | | 70 | | |
| Comparison example 1 | | | 70 | |
| Comparison example 2 | | | | 70 |
| Buna CB 25 | 30 | 30 | 30 | 30 |
| Mineral oil* | 37.5 | 37.5 | 37.5 | 37.5 |
| Vulkasil S******** | 80 | 80 | 80 | 80 |
| Silane Si 69 ®********* | 6.4 | 6.4 | 6.4 | 6.4 |
| ZnO RS | 2.5 | 2.5 | 2.5 | 2.5 |

|  | Compound 1 | Compound 2 | Compound 3* | Compound 4* |
|---|---|---|---|---|
| Degree of reinforcement | 5.2 | 3.9 | 4.3 | 3.5 |
| Hardness at 23° C., Shore A | 70 | 70 | 68 | 70 |
| Hardness at 70° C., Shore A | 67 | 68 | 65 | 69 |
| Elasticity 23° C., % | 38 | 36 | 35 | 37 |
| Elasticity 70° C., % | 58 | 56 | 53 | 52 |

-continued

|  | Com-<br>pound 1 | Com-<br>pound 2 | Com-<br>pound 3* | Com-<br>pound 4* |
|---|---|---|---|---|
| Comparison Mixture properties, DIN 53523 Roelig, 10 HZ, DIN 53513 | | | | |
| tan delta-20° C. | 0.486 | 0.468 | 0.485 | 0.472 |
| tan delta 60° C. | 0.099 | 0.105 | 0.122 | 0.126 |

Result:
*Enerthene 1849-1, mineral oil plasticizer, Mobil Schmierstoff GmbH
**Light stabilizer wax, Rhein Chemie Rheinau
***Anti-ageing agent (6PPD), Bayer AG
****Anti-ageing agent (TMQ), Bayer AG
*****Sulfenamide accelerator (CBS), Bayer AG
******Guanidine accelerator (DPG), Bayer AG
*******Silica, Bayer AG
********Silane, Degussa

| | |
|---|---|
| ML @ 100° C. | Mooney values measured at 100° C. |
| GPC: | gel permeation chromatography |
| $M_w$: | average molecular weight |
| $M_w/M_n$: | polydispersity |
| L value: | viscosity of a solution of 0.5 g polymer/100 ml toluene (25° C., Ubbelohde viscometer) |
| Δ L value: | difference in the L values before coupling and with coupling |
| Tg: | glass transition temperature |
| Degree of coupling: | number of coupled polymer chains, based on the total of polymer chains |
| Degree of branching: | based on the degree of coupling, the degree of branching describes the percentage sum of branchings > 2nd coupling (calculated via the monomer concentration) |

Determination of the Degree of Coupling and Branching

GPC measurements were used to estimate the degree of coupling and the degree of branching. To determine the degree of coupling, the content of monomers present in non-coupled chains is determined from the GPC measurements. In coupled systems this corresponds to the peak maximum at the smallest molecular weight of the GPC measurements. The degree of coupling is calculated from the ratio of the sum of the peak maxima at m-fold molecular weight (m=2, 3, 4, . . . ) and the sum of all the monomers (can be estimated from the sum of all the peak maxima).

The ratio of the sum of the m-fold molecular weights (m=2, 3, 4 . . . ) and the sum of the m-fold molecular weights (m=3, 4, . . . ) is called the degree of branching.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Branched and coupled polymers based on conjugated dienes or on conjugated dienes and vinylaromatic compounds and on polyfunctional, organic compounds having at least 4 groups which are capable of coupling, wherein the polymers have a molecular weight ratio ($M_w/M_n$) of 1.0 to 3.0, a weight-average molecular weight ($M_w$) of 400,000 to 2,000,000, a glass transition temperature ($T_G$) of −50 to −10° C., an amount of 1,2-vinyl groups of 40 to 80%, based on the diene units present in the polymer, and a degree of coupling of at least 45%, at least 60% of the coupled polymers having a degree of branching of greater than two, with the proviso that the amount by weight of polymers with 4- and more than 4-fold branching, based on 100 g of polymer, is greater than the amount by weight of polymers with 3-fold branching, and wherein the difference in the solution viscosity of the polymers before and after the coupling is in the range from 100 to 400 (measured with a solution of 0.5 g polymer in 100 ml toluene, determined at 25° C. with an Ubbelohde viscometer).

2. Branched and coupled polymers according to claim 1, wherein the molecular weight ratio ($M_w/M_n$) is 1.5 to 2.8, the weight-average molecular weight ($M_w$) is 600,000 to 1,400,000, the glass transition temperature ($T_G$) is −40 to −15° C. the amount of 1,2-vinyl groups is 50 to 70% and the degree of coupling is 48 to 80%, and 70 to 95% of the coupled polymers have a degree of branching of greater than two, wherein the difference in the solution viscosity before and after the coupling is 140 to 300 and the amount by weight of polymers with 4- and more than 4-fold branching is 10–50% greater than the amount of polymers with 3-fold branching.

3. Process for the preparation of the polymers according to claim 1, comprising the steps of polymerizing conjugated dienes or conjugated dienes with vinylaromatic compounds in the presence of inert organic solvents and in the presence of organic alkali metal compounds, reacting the alkali metal-terminated polymer anions formed with organic, polyfunctional compounds which have at least 4 groups which are capable of coupling, wherein the molar ratio of polyfunctonal compounds employed to alkali metal-terminated polymer anions is 0.1 to 0.28:1.

4. A tire comprising a polymer according to claim 1.

* * * * *